United States Patent
Wilson et al.

(10) Patent No.: US 7,681,821 B2
(45) Date of Patent: Mar. 23, 2010

(54) DEMONSTRATION MODE FOR ELECTRONIC FISHING REEL

(75) Inventors: Robert R. Wilson, Broken Arrow, OK (US); M. Scott Smith, Broken Arrow, OK (US); Tony Wei, Jiangsu (CN)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 63 days.

(21) Appl. No.: 12/030,509

(22) Filed: Feb. 13, 2008

(65) Prior Publication Data

US 2009/0199454 A1    Aug. 13, 2009

(51) Int. Cl.
*A01K 89/00* (2006.01)
*A01K 97/12* (2006.01)

(52) U.S. Cl. .............................. 242/223; 242/323; 43/17

(58) Field of Classification Search ................. 242/226, 242/305, 238, 224, 310, 311, 323; 43/17
See application file for complete search history.

(56) References Cited

U.S. PATENT DOCUMENTS

| | | | |
|---|---|---|---|
| 2,553,480 A * | 5/1951 | Seifert | 242/305 |
| 3,275,260 A * | 9/1966 | Woollen | 242/305 |
| 5,199,665 A | 4/1993 | Tipton | |
| 6,012,665 A * | 1/2000 | Olona | 242/250 |
| 6,257,513 B1 | 7/2001 | Cockerham et al. | |
| 6,311,837 B1 * | 11/2001 | Blaustein et al. | 206/362.2 |
| 6,433,703 B1 * | 8/2002 | Tucker | 340/815.51 |
| 6,467,617 B1 * | 10/2002 | Chen | 206/315.11 |
| 7,364,105 B1 * | 4/2008 | Yeh | 242/305 |
| 7,523,882 B2 * | 4/2009 | Priednieks | 242/224 |
| 2002/0038772 A1 * | 4/2002 | Blaustein et al. | 206/362.2 |
| 2003/0066145 A1 * | 4/2003 | Prineppi | 15/22.1 |
| 2004/0168272 A1 * | 9/2004 | Prineppi | 15/28 |
| 2005/0172492 A1 * | 8/2005 | Blaustein et al. | 30/43.92 |
| 2005/0177961 A1 * | 8/2005 | Prineppi | 15/22.1 |
| 2006/0265825 A1 * | 11/2006 | Prineppi | 15/28 |

* cited by examiner

*Primary Examiner*—Evan H Langdon
(74) *Attorney, Agent, or Firm*—Fellers, Snider, Blankenship, Bailey and Tippens

(57) ABSTRACT

A fishing reel is provided with an electronic demonstration feature that allows for electronic features of said reel to be activated, but which prevents prospective purchasers from unnecessarily depleting battery life of the device. An on/off switch is provided for selectively closing the circuit. A "try me" switch is also provided for temporarily activating the electronics. The "try me" switch prevents manipulation of the on/off switch into the "on" position but allows for the electronic feature to be temporarily activated. After purchase, the "try me" switch may be is removed to allow the on/off switch to function without interference.

7 Claims, 3 Drawing Sheets

DEMONSTRATION MODE FOR ELECTRONIC FISHING REEL

FIELD OF THE INVENTION

The invention relates to fishing reels having an electronic bait alert. More particularly, the invention relates to fishing reels having a removable "try me" switch that allows a potential purchaser to activate the alert while minimizing battery drain.

BACKGROUND OF THE INVENTION

One well known style of fishing reel is the spinning-type fishing reel. A spinning reel typically has a housing with an oscillating spool at its forward end. A rotor rotates about the spool axis by cooperative movement of a crank handle and has an associated bail assembly that wraps line onto the oscillating spool. In one construction, the rotor has integrally formed ears at diametrically opposite locations that define a support for a pair of bail arms between which a U-shaped bail wire is connected.

A technological advance in fishing reels is the inclusion of electronic features such as an electronic "bait alert". An electronic bait alert notifies a fisherman when line is being pulled out by a fish. It is desirable to allow a purchaser to try out electronic features at point of sale. Therefore, reels may be packaged such that the electronic features may be triggered while the reel remains in the package. A downside of packaging devices in such a way that allows a potential purchaser the opportunity to try out features is that battery life may be consumed. Therefore, it is desirable to provide features that permit a user to try out a bait alert on a reel that also serve to conserve the battery life of the device.

SUMMARY OF THE INVENTION

Modern fishing reels may be provided with electronic bait features including electronic alert devices. It is desirable to provide a prospective buyer with the opportunity to experience electronic functions while also preserving battery life of the device. The reel of the present invention is provided with a demonstration "try me" mode built into the reel that allows for electronic features to be activated temporarily.

In an effort to minimize battery drain at the point of sale, a "try me" switch is provided to facilitate temporary activation of the electronic features. The "try me" switch of the invention prevents the on-off switch on the reel from being turned to the "on" position. The "try me" button is preferably inserted into the reel after the reel has been completely assembled. In the preferred embodiment, the "try me" button has a tab that inserts into a slot in the on/off switch that prevents the on/off switch from being manipulated. The tab locks the on/off switch into the "off" position until the consumer removes the "try me" button after purchasing the reel. Although the invention is shown in the context of a spinning reel, it should be understood that the invention could also be utilized on other types of reels.

The bait alert demonstration may be activated by pushing down on the "try me" button, which causes a plunger on the "try me" button to close contacts in the reel electronics. The "try me" button activates the bait alert electronics for a time interval that preferably does not exceed two seconds. However, the permissible time length can be easily modified in the software of the reel electronics to be either longer or shorter than two seconds. After the "try me" button is released, the button is returned to its original position by a spring action caused by the shape of the top of the button, i.e., by "wings" that are formed on opposite sides of the button. When the "try me" button returns to its original position, the plunger lifts off of the electronics contacts, which deactivates the bait alert electronics and removes power supplied to the electronics from the reel batteries. The contacts used in the "try me" button are preferably the same contacts used by the on/off switch to turn the reel on when switched to the "on" position.

DETAILED DESCRIPTION OF THE PREFERRED EMBODIMENTS

Figure 1:
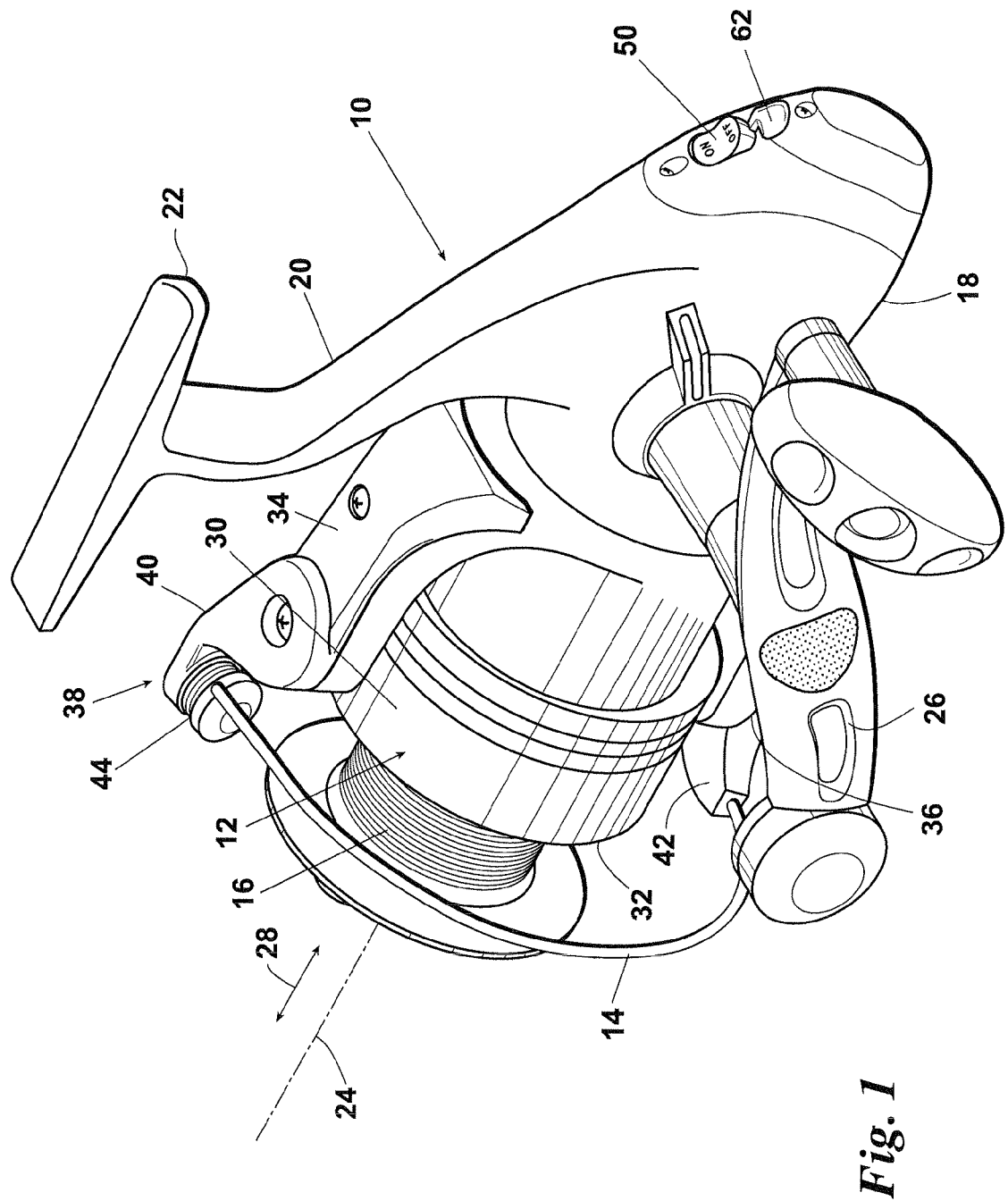
FIG. 1 is a perspective view of a spinning reel of the invention, having a "try me" button for bait alert activation.

Referring now to FIG. 1, a spinning-type fishing reel according to the present invention is shown at 10. Rotor 12, and more specifically the "bail" or "bail wire" 14, are operable to wrap a supply of line around spool 16 at the front of reel 10. It should be understood that reel 10 described herein is only exemplary of the environment for the invention. Many variations in the configuration of the reel 10 shown are contemplated by the invention.

Reel 10 has a main housing 18 that encases an operating mechanism (not shown). Housing 18 has an integrally formed stem 20 that terminates at foot 22, which is attachable to a fishing rod (not shown) by conventional means.

Rotor 12 is rotated about central longitudinal axis 24 by crank handle 26 that is interrelated to the operating mechanism. Rotor 12 wraps line continuously about spool 16 as rotor 12 rotates. The operating mechanism also includes structure for oscillating spool 16 in a fore and aft direction, as indicated by double-headed arrow 28, as rotor 12 rotates, to thereby assure that the line is evenly distributed axially along spool 16.

Rotor 12 has skirt 30, spool shoulder 32 and diametrically, oppositely located first and second ears 34, 36, which cooperatively define a support for a movable bail assembly 38. Bail assembly 38 has first bail arm 40 mounted to first bail ear 34 and second bail arm 42 mounted to second bail ear 36. The ends of U-shaped bail wire 14 are fixedly attached, one each to bail arms 40, 42, so that bail arms 40, 42 and bail wire 14 are movable as a unit.

Figure 2:
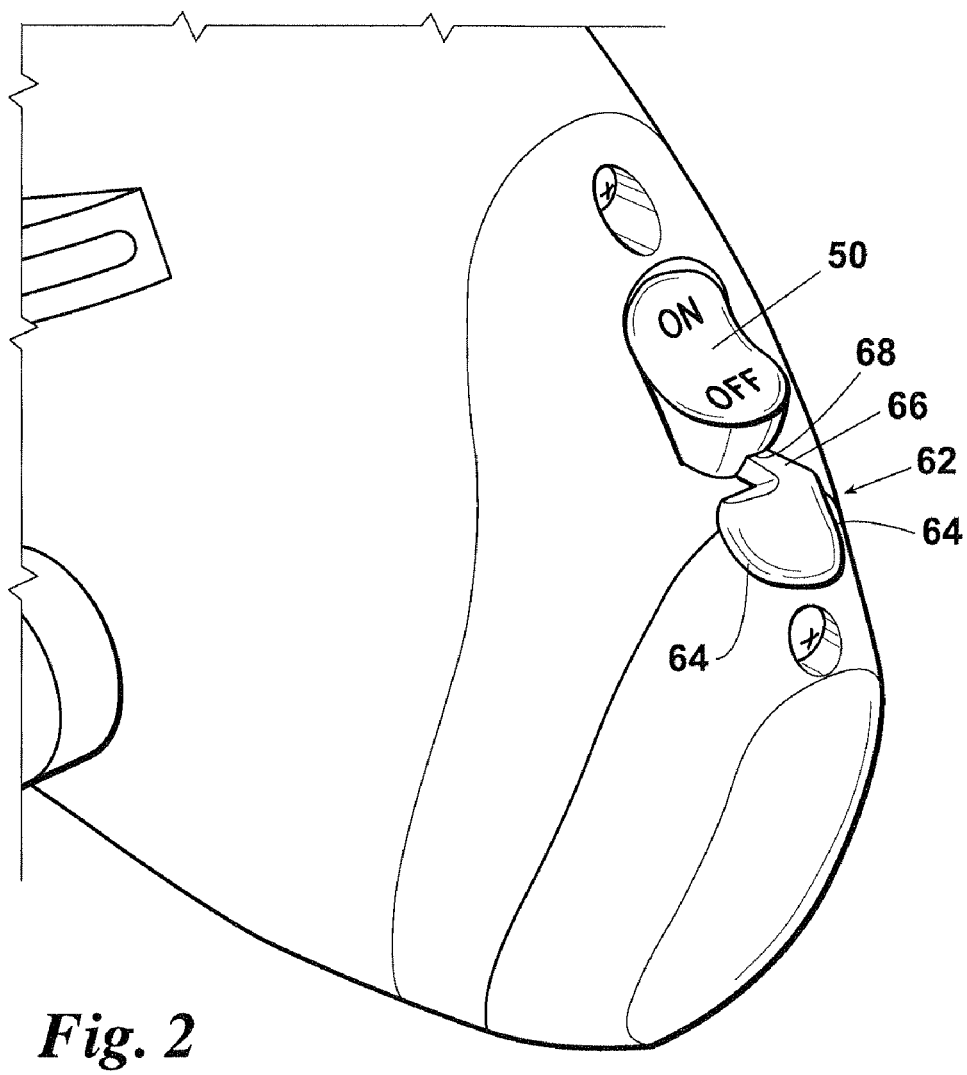
FIG. 2 is a close-up view of an on/off switch and "try me" button for bait alert activation.
Figure 3A:
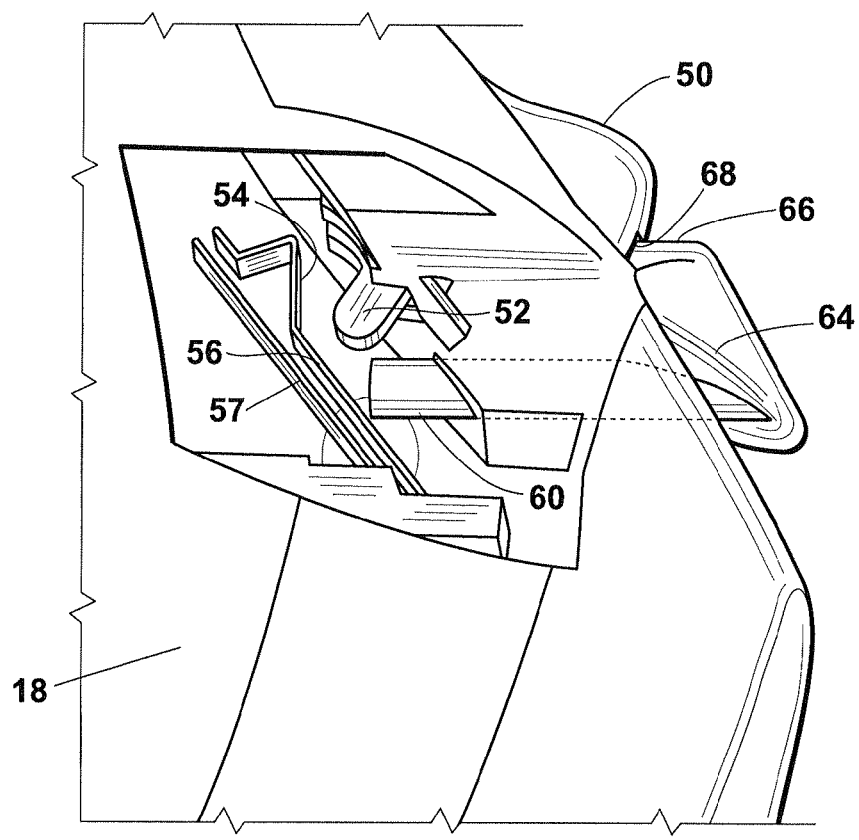
FIG. 3A is a partial cut-away view of the reel of FIG. 1 showing bait alert activation switches and internal contacts that comprise the bait alert circuit.
Figure 3B:
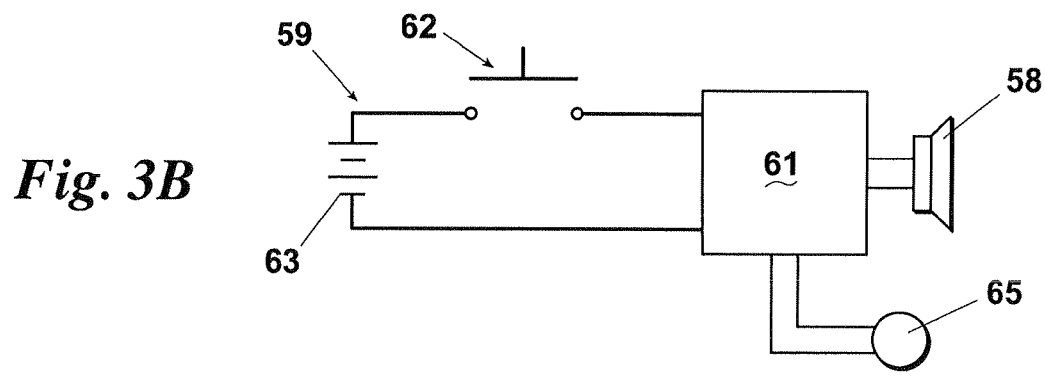
FIG. 3B is a circuit equipment showing the "try me" button as an actuator for the bait alert circuit.
Figure 3C:
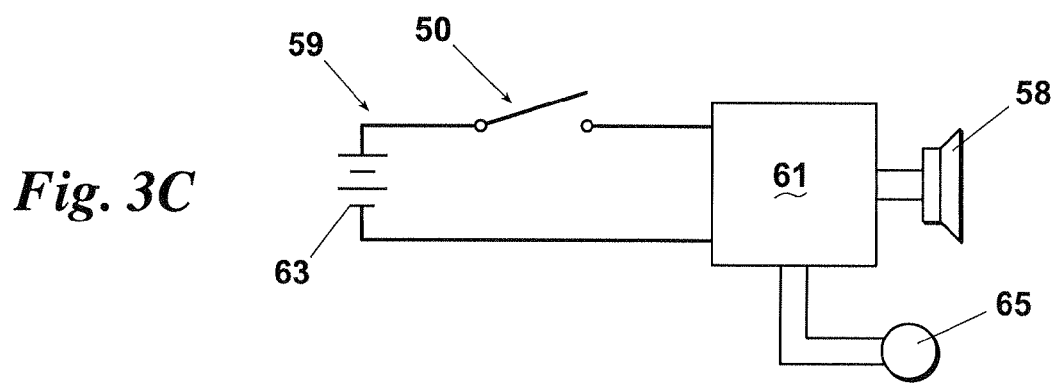
FIG. 3C is a circuit equipment showing the on/off switch as an actuator for the bait alert circuit.

On/off switch 50, best seen in FIGS. 2 and 3, is provided to selectively activate a bait alert feature on the device. As can be seen in FIG. 3, on/off switch 50 has an interiorly extending toggle 52 (FIG. 3B) that selectively engages a raised portion 54 of contact 56 for forcing bait alert contacts 56, 57 to flex into contact with one another, thereby closing circuit 59, shown schematically in FIGS. 3A and 3B, and permitting the bait alert, e.g., speaker 58, and electronics 61 to be supplied with power from battery 63. The bait alert may also be comprised of a blinking light, vibration device or other suitable alert device. Preferably, reel 10 is packaged such that the bait alert will generate an audible signal, e.g., via speaker 58, or other type of signal, once contacts 56, 57 are forced into contact with one another.

In use, on/off switch 50 forces contacts 56, 57 into contact with one another. Electronics 61 are then powered by battery 63. In the powered state, electronics 61 are ready to receive data from bait alert sensor 65 (FIGS. 3B, 3C), to indicate that line is being pulled out from reel 10. Bait alert sensor 65 may be of the type described in U.S. Pat. No. 5,199,665, hereby incorporated by reference, or by another type of bait alert mechanism known in the art. Therefore, once contacts 56, 57 touch one another, the alert is activated.

Figure 4:
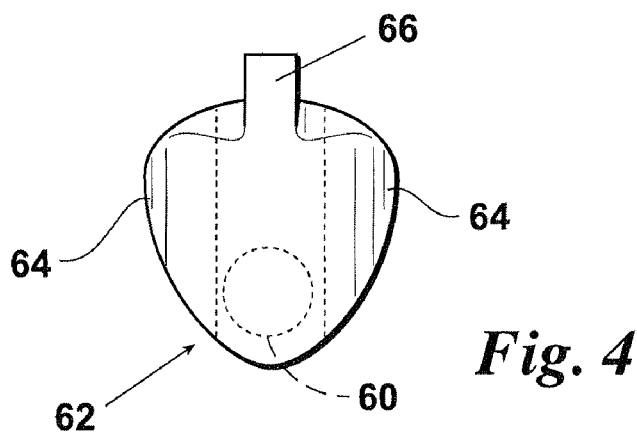
FIG. 4 is a plan view of the "try me" button of the invention.

Still referring to FIG. 3A, similar to activation of the bait alert by on/off switch 50, post 60 of "try me" button 62 is oriented to selectively engage upper contact 56, for selectively deflecting upper contact 56 into engagement with lower contact 57. "Try me" button 62 is provided with flexible wing sections 64 (FIGS. 2 and 4), which are resilient and function to return "try me" button 62 to an outermost or starting position. "Try me" button 62 further is provided with tab 66 (FIGS. 2 and 4), which inserts into receptacle 68 (FIGS. 2 and 3) of on/off switch 50 to prevent on/off switch 50 from being activated while "try me" button 62 is in place.

After purchase, the user may remove "try me" button 62, which removes tab 66 from receptacle 68. Therefore, after "try me" button 62 is removed, on/off button 50 is available for normal use. However, prior to purchase, while "try me" button 62 is still in place, on/off button 50 is unavailable for use, thereby preventing on/off button 62 from being inadvertently left in the "on" position for extended periods of time, which would result in diminishing the battery life of the battery in the reel.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. Fishing reel comprising:
   a reel housing;
   a power supply;
   a circuit including said power supply;
   an alert that is activated when said circuit is closed;
   an on/off switch in said reel housing for selectively closing said circuit;
   a second switch that may be manipulated to temporarily close said circuit;
   wherein said on/off switch defines a receptacle; and
   wherein said second switch defines a tab for insertion within said receptacle, said tab for preventing manipulation of said on/off switch while said tab is received within said receptacle.

2. The fishing reel according to claim 1 wherein:
   said second switch is removable, for permitting a prospective user to access said second switch at point of sale, but when removed, allows said on/off switch to function.

3. The fishing reel according to claim 1 wherein:
   said second switch is removable.

4. The fishing reel according to claim 1 wherein:
   said second switch has a flexible structure in contact with an exterior of said housing to return said second switch to an original position after release of said second switch.

5. The fishing reel according to claim 1 wherein:
   said circuit comprises a first contact and a second contact;
   said on/off switch selectively engages a raised portion of said first contact for forcing movement of said first contact and for locating said on/off switch in an "on" position.

6. The fishing reel according to claim 5 wherein:
   said second switch temporarily forces said first contact and said second contact together to close said circuit; and
   wherein said contacts disengage upon release of said second switch.

7. The fishing reel according to claim 1 wherein said fishing reel is a spinning reel.

\* \* \* \* \*